United States Patent [19]
Moller

[11] Patent Number: 5,148,943
[45] Date of Patent: Sep. 22, 1992

[54] METHOD AND APPARATUS FOR METERING AND BLENDING DIFFERENT MATERIAL INGREDIENTS

[75] Inventor: Richard W. Moller, Fenton, Mich.

[73] Assignee: Hydreclaim Corporation, Fenton, Mich.

[21] Appl. No.: 716,084

[22] Filed: Jun. 17, 1991

[51] Int. Cl.⁵ ............................................. B67D 5/08
[52] U.S. Cl. ........................................ 222/1; 177/50; 222/55; 222/56; 222/57; 222/77; 222/142; 222/64; 364/567; 425/135
[58] Field of Search ............ 222/1, 64, 55, 56, 57, 222/58, 77, 71, 135, 138, 139, 142, 145; 177/1, 50, 70, 105; 425/135, 145, 148; 364/479, 567, 571.04, 571.05, 571.06

[56] References Cited

U.S. PATENT DOCUMENTS

| | | | |
|---|---|---|---|
| 2,568,332 | 9/1951 | Genovese | 222/56 X |
| 2,623,658 | 12/1952 | Johansen | 222/138 X |
| 2,864,537 | 12/1958 | Throop et al. | 222/57 |
| 3,245,584 | 4/1966 | Linville | 222/57 |
| 3,362,490 | 1/1968 | Maxwell | 177/70 |
| 3,889,848 | 6/1975 | Ricciardi et al. | 177/105 X |
| 4,222,448 | 9/1980 | Sunkle et al. | 177/70 X |
| 4,272,824 | 6/1981 | Lewinger et al. | 222/56 X |
| 4,459,028 | 7/1984 | Bruder et al. | 177/70 X |
| 4,544,279 | 10/1985 | Rudolph | 177/70 X |
| 4,671,908 | 6/1987 | Gwinn et al. | 425/135 X |
| 4,961,887 | 10/1990 | Crumpler et al. | 222/58 |
| 5,014,889 | 5/1991 | Hayashi | 222/77 |
| 5,064,099 | 11/1991 | Iwako | 222/142 |

Primary Examiner—Kevin P. Shaver
Attorney, Agent, or Firm—Learman & McCulloch

[57] ABSTRACT

A plurality of individual plastic material ingredients are metered from respective individual material hoppers at controllable individual discharge rates, blended, and delivered to a common hopper. The blend of plastic material ingredients in the common hopper is discharged to an extruder or other material processing machine. The material processing rate of the processing machine is determined based on the sum of the discharge rates of the individual ingredients to the common hopper plus or minus the discharge rate of the blend from the common hopper to the processing machine. The discharge rates of the individual material ingredients from the individual hoppers to the common hopper is controlled as needed to maintain a preset recipe of the blend at the determined material processing rate of the processing machine.

14 Claims, 3 Drawing Sheets

METHOD AND APPARATUS FOR METERING AND BLENDING DIFFERENT MATERIAL INGREDIENTS

FIELD OF THE INVENTION

The present invention relates to metering of different material ingredients for supply as a blend or mixture to a material processing machine and, more particularly, to a continuous weight loss gravimetric apparatus and method for metering different material ingredients at controlled metering rates to maintain preset proportions of the ingredients in the blend at the material processing rate of the processing machine.

BACKGROUND OF THE INVENTION

Continuous weight loss blenders of various types have been used for supplying a blend or mixture of different pelletized, free-flowing plastic material ingredients to a plastic extrusion machine. One type of continuous weight loss blender includes a weight metering component for each material ingredient to be blended. Each ingredient is weighed as it is discharged by a driven auger from an individual weigh hopper to a common mixing hopper where the ingredients are mixed or blended. From the mixing hopper, the blend or mixture of the different plastic ingredients is supplied to an extrusion machine typically located beneath the mixing hopper.

In operation of continuous weight loss blenders, the weigh hoppers are initially filled with a given weight of each plastic material by a gate valve, squeeze valve, or directly from a vacuum receiver. As each material is fed from its weigh hopper by a feed auger, a load cell senses the loss in weight of each hopper and generates analog signals representative of the weight loss. The analog signals are converted to digital signals and provided to a digital computer control microprocessor that calculates the material discharge rate from each hopper and adjusts the speed of the associated auger to provide the required output of each ingredient to satisfy the preset ratio or proportion of the ingredients in the blend to be supplied to the extrusion machine.

As each weigh hopper empties, it must be refilled. In particular, as a preset low material level of each weigh hopper is reached, a signal is generated to a refill device to supply plastic material to the hopper to a preset high material level. During the refill period, the weight loss metering system of the blender is actually in volumetric operation, requiring the computer control microprocessor to calculate how much material was emptied from the hopper during the refill period. As a result, considerable effort has been directed toward developing systems for controlling the blender operation during the refill period in order to improve the accuracy of the recipe (i.e., proportions or ratios of ingredients) provided by the blender to the extrusion machine.

One control system adopted to improve blender accuracy employs two capacitance proximity level switches in the lower mixing hopper to increase or decrease the speeds of each motor-driven auger to achieve the preset ratio of ingredients and continuous operation. The augers are operated at speeds to maintain a material level in the mixing hopper between the proximity switches. If the high level switch is reached by the material in the mixing hopper, the speed of the augers is reduced. On the other hand, if the low level switch is reached, the speed of the augers is increased. This type of operation is not suitable for direct extrusion since a sufficiently accurate discharge rate of the blended materials to the extrusion machine cannot be established and maintained for a given machine throughput.

Another control system adapted to improve blender accuracy uses a single capacitance level switch that monitors the level of ingredients in the mixing hopper and adjusts the speed of the motor-driven augers of the respective weigh hoppers to maintain an equilibrium material level in the mixing hopper. Since the capacitance switch is actually a volumetric device and only monitors the material level in the mixing hopper, any variations in the bulk density of the ingredients will adversely affect the accuracy of the material discharge rate to the extrusion machine. For example, the weight of material in the mixing hopper will be lower as the bulk density of the ingredients decreases and will be higher as the bulk density increases. Thus, although the feed rate of the materials to the mixing hopper is accurately known, the discharge rate to the extrusion machine is not known with accuracy since the actual weight of the ingredients in the mixing hopper is not known with accuracy. Inaccurate material discharge rates to the extrusion machine thereby result.

Still another control system adapted to improve blender accuracy involves a dosing technique wherein a central, gravity-feed weigh hopper discharges the major material ingredient directly to an underlying mixing hopper and secondary auger fed weigh hoppers are provided for the concurrent discharge of minor material ingredients to the mixing hopper. The computer control microprocessor of such a blender adjusts the material discharge rate of the secondary hoppers in response to the material discharge rate of the central weigh hopper so as to dose in the correct rate of the minor material ingredients to maintain the preset ratio of material ingredients in the blend. Unfortunately, as the discharge rate of each weigh hopper is altered to add material, the discharge rate of the central weigh hopper is, in effect, changed. Thus, as the material discharge rates of the secondary hoppers are adjusted, the ratio of material ingredients varies from the preset specification therefor such that the microprocessor continually tries to modify operation of the blender to stabilize the ratio within the preset limits. Moreover, this control system is affected by variations in the bulk density of the ingredients and requires extended time periods to adjust thereto.

It is an object of the present invention to provide an improved apparatus and method for metering different material ingredients for supply to a material processing machine, such as an extruder, that overcomes the aforementioned deficiencies and disadvantages.

It is another object of the present invention to provide an improved apparatus and method for metering different material ingredients for supply to a material processing machine wherein metering of the ingredients is controlled in dependence on a learned material processing rate of the processing machine to maintain a highly accurate ratio or proportions thereof in the blend at the learned material processing rate.

It is another object of the present invention to provide an improved apparatus and method for metering different material ingredients for supply to a material processing machine wherein metering of the ingredients is controlled in dependence on a learned material processing rate of the processing machine to maintain a substantially constant weight or head of the blend of the ingredients for supply to the machine.

SUMMARY OF THE INVENTION

The present invention contemplates apparatus for metering different material ingredients for discharge to a material processing machine wherein the apparatus comprises a plurality of individual metering devices for providing a controllable material discharge rate of each ingredient to a common hopper. Each metering device comprises a material hopper for containing a material ingredient to be metered, a weighing device operably associated with each material hopper for detecting the loss in weight of the ingredient therein, and an electrical motor-driven material discharge device operably associated with each material hopper for discharging the ingredient therefrom. Each metering device includes a computer control device coupled to the weighing device to determine a material discharge rate based on weight loss of the ingredient from each hopper over time and coupled to the material discharge device for controlling the material discharge rate thereof.

The apparatus preferably includes means for mixing the ingredients discharged from the metering devices to form a blend received in the common hopper.

The blended ingredients in the common hopper are discharged to a material processing machine, such as an extruder, at a rate determined by a learned material processing rate (e.g., extrusion rate) of the machine. A weighing device is operably associated with the common hopper for detecting the change in weight of the ingredients therein during discharge from the common hopper to the material processing machine.

A master computer control unit is coupled to the weighing device of the common hopper for determining a discharge rate of the ingredients from the common hopper to the processing machine based on the weight loss of the common hopper over time. The master computer control device is also coupled to the computer control devices of the individual metering devices in such manner that the individual material discharge rates thereof are input to the master computer control unit and such that the material discharge rates thereof are controllable by the master computer control unit. The master computer control unit determines (learns) the material processing rate of the processing machine based on the sum of the material discharge feed rates of the individual metering devices to the common hopper plus or minus the discharge rate of the ingredients from the common hopper to the processing machine. The master computer control device communicates with the individual computer control devices of the metering devices to control the material discharge rate of each metering device to the common hopper as needed to maintain a preset recipe or ratio of the ingredients at the determined material processing rate of the processing machine. The master computer control unit also controls the material discharge rates of the metering devices to maintain a substantially constant weight or head of the ingredients in the common hopper during the material processing operation.

A method in accordance with the invention involves metering a plurality of individual material ingredients to a common hopper at controllable individual material discharge rates. The ingredients discharged from the material hoppers preferably are mixed to form a blend received in the common hopper. The weight loss of the blended ingredients in the common hopper is determined during discharge therefrom to a material processing machine, such as an extruder. The material processing rate (e.g., extrusion rate) of the processing machine is determined based on the sum of the discharge rates of the ingredients to the common hopper plus or minus the discharge rate of the ingredients from the common hopper to the processing machine. The discharge rates of the ingredients to the common hopper are controlled as needed to maintain a preset recipe of the ingredients at the determined material processing rate of the processing machine.

Preferably, the discharge rates of the ingredients are controlled so as to maintain a substantially constant weight or head of the ingredients in the common hopper at the material processing rate of the processing machine. Typically, the weight of the ingredients in the common hopper is stabilized at a center of a preset narrow weight range at the material processing rate of the machine.

THE DRAWINGS

DETAILED DESCRIPTION

Figure 1:
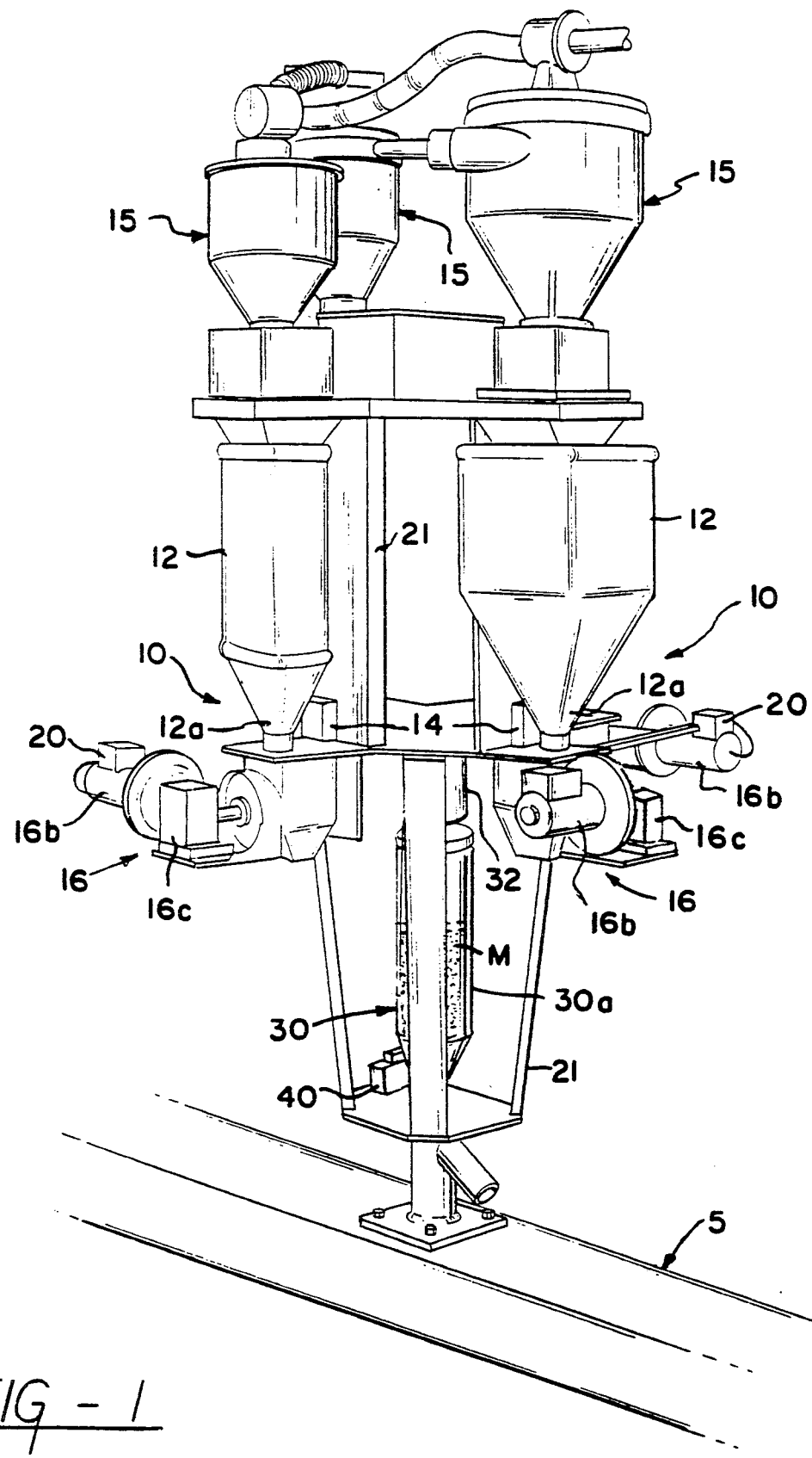
FIG. 1 is an isometric view of a metering and blending apparatus in accordance with one embodiment of the invention.
Figure 2:
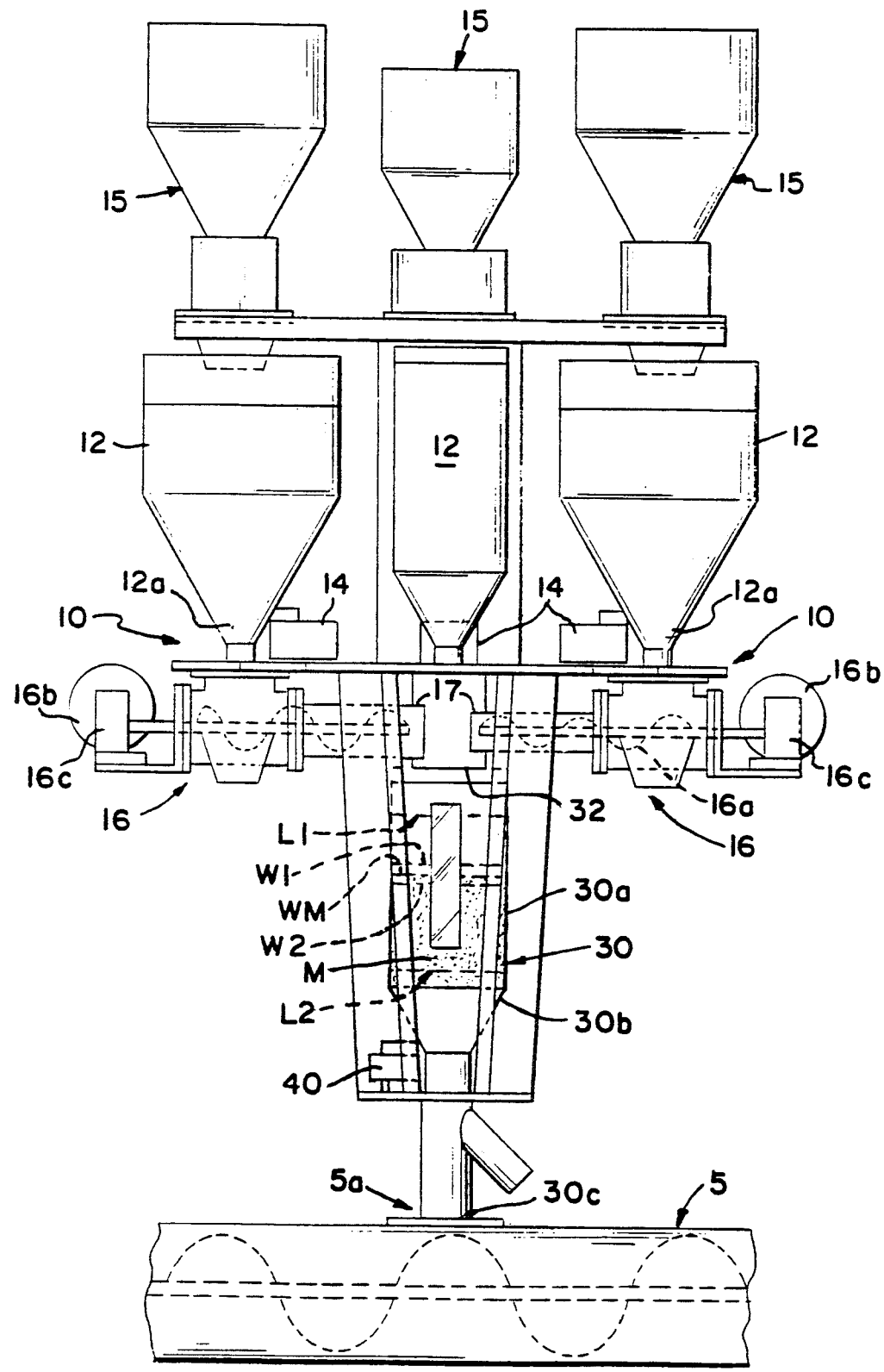
FIG. 2 is a side elevation of the apparatus of FIG. 1.
Figure 3:
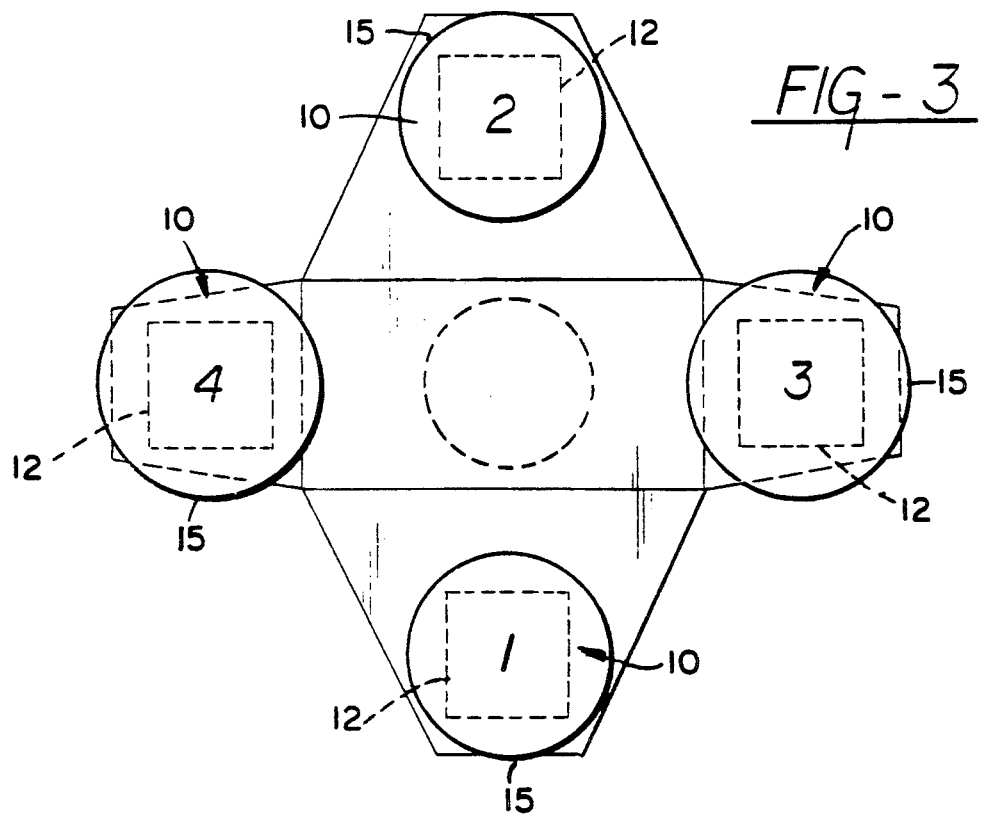
FIG. 3 is a plan view of the apparatus of FIG. 1.
Figure 4:
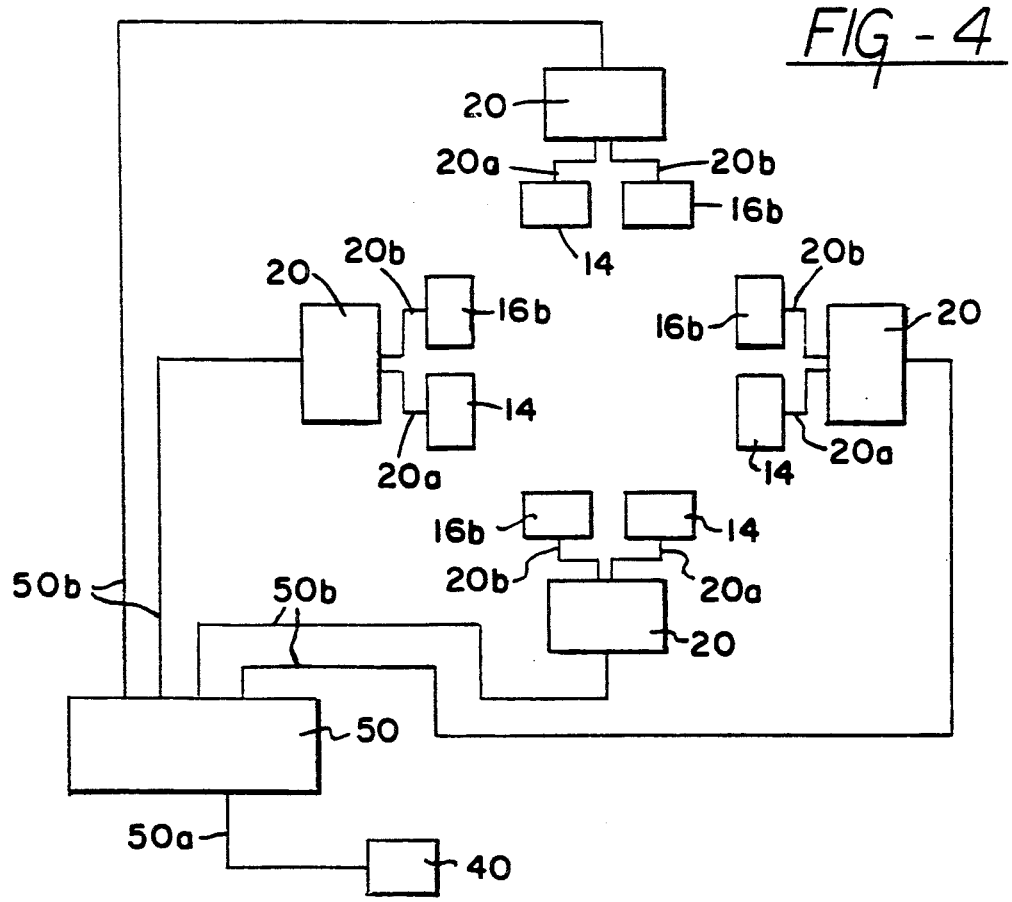
FIG. 4 is a block diagram of the master computer control unit and individual computer control devices of the hoppers.

FIGS. 1–4 illustrates apparatus in accordance with one embodiment of the invention for metering and blending different plastic material ingredients, such as different plastic pellets, for discharge to an extrusion machine 5. The apparatus comprises a plurality of individual metering devices 10 each comprising an individual material hopper 12 for containing a plastic material ingredient to be blended. The material hoppers 12 are each initially filled with a known starting weight of an individual material ingredient from a known supply hopper or vacuum receiver 15 located thereabove.

Each metering device 10 also comprises a weight measuring device 14 for detecting the weight loss of the ingredient therein and an electrical motor-driven material discharge device 16 for discharging the ingredient therefrom at a controlled material discharge rate. The device 14 typically comprises a precision, offset, cantilever load cell operably connected to each individual material hopper 12 for solely supporting the hopper 12 and detecting the loss in weight of the plastic material ingredient therein. The material discharge device 16 typically comprises a precision auger 16a driven by a variable speed DC electrical motor 16b through a gear reducer 16c. The auger 16a is operably associated with a discharge end 12a of each material hopper 12 for discharging the plastic material ingredient therefrom at a known controlled material discharge rate through a feed conduit 17. Each hopper 12, measuring device 14, and discharge device 16 described above collectively is termed a mass flow weigh hopper system in that the measuring device 14 supports only the hopper 12 and not the discharge device 16, which is supported on the frame 21 of the apparatus.

Each metering device 10 also includes a digital computer control device 20 (shown schematically). Each computer control device 20 is coupled to or interfaced with the weight measuring device 14 and the discharge motor 16b via interfaces 20a, 20b (e.g., RS 485 serial network interfaces). Each computer control device 20 receives weight loss signals from the measuring device 14 over time and determines a material discharge rate based on the weight loss signals from each respective hopper 12. The weight loss signals are generated by the load cells as analog signals which are converted to digital signals by a conventional signal convertor (not shown) for input to the respective computer control devices 20.

As will become apparent below, each computer control device 20 controls the speed of the auger motor 16b of the associated material discharge device 16 so as to provide a controlled material discharge rate of each ingredient to a common hopper 30. Each computer control device 20 also controls filling of each hopper 12 to the initial known starting weight and also refilling thereof when a low supply or weight condition is sensed in each hopper 12.

Metering devices 10 of the type described above are available as modular 270 Auto-Adjust weight loss metering unit from Hydreclaim Corporation, 3145 Copper Ave., Fenton, Mich.

The common hopper 30 is of the mass flow weigh type and is adapted to receive the material ingredients discharged from the individual metering devices 10 via a cascade blending chamber 32 where the ingredients are cascaded and mixed to form a substantially homogeneous blend or mixture for reception by the common hopper 30. The common hopper 30 has a cylindrical, preferably transparent wall 30a to enable viewing of the level of the blend M in the hopper 30 and is located to enable the blend M to be discharged directly to the underlying throat 5a of the extrusion machine 5 (or other material processing machine). For this purpose the common hopper 30 includes a lower conical discharge end 30b terminating in a lower, open discharge opening 30c to provide flow of the blend M to the extrusion machine 5. The ratio of the inner diameter of the hopper wall 30a to the inner diameter of the discharge end 30b is approximately 5:1.

A weighing device 40, such as a precision, offset, cantilever load cell, is operably connected to and solely supports the common hopper 30 at the discharge end 30a. The weighing device 40 detects the change in weight of the blend M therein during the admission and discharge of material to and from the common hopper 30.

A master digital computer control unit 50 (FIG. 4) is coupled via interface 50a (e.g., RS 485 serial network interfaces) to the weighing device 40 of the common hopper 30 for receiving weight loss signals therefrom (analog to digital converted signals) over time and determining a blend discharge rate from the common hopper 30 to the extrusion machine 5. The master computer control unit 50 is also coupled via interfaces 50b (e.g., RS 485 serial network interfaces) to the computer control devices 20 to monitor and supervise continually the overall operation of the metering units 10. For example, the master computer control unit 50 continually receives material discharge rate data of the individual metering devices 10 over interfaces 50b and controls those material discharge rates as needed to maintain the preset recipe or proportions of the material ingredients in the blend at the learned extrusion rate of the machine 5.

In particular, the master computer control unit 50 determines (learns) the plastic material extrusion rate of the extrusion machine 5 based on the sum of the material discharge rates of the individual metering devices 10 plus or minus the discharge rate of the blend from the common hopper 30 to the extrusion machine 5. The master computer control unit 50 communicates via the interfaces 50b with the individual computer control devices 20 to receive the material discharge rates of the metering units 10 and to control the material discharge rates of the metering devices 10 to the common hopper 30 as needed to maintain a preset recipe or ratio of the material ingredients in the blend M in the common hopper 30 as well as to maintain a substantially constant head (weight) of the blend M in the common hopper 30 over the throat 5a at the determined plastic material extrusion rate of the extrusion machine 5. The master computer control device 50 continually monitors and adjusts the material discharge rates of the metering units 10 as the bulk density of the materials changes and the extrusion rate of the machine 5 changes under typical processing conditions.

The master computer control unit 50 also receives status information from each computer control device 20. For example, each computer device 20 reports hopper weight data to the master computer control unit and sends abort data thereto when the weight of material ingredient in the hopper 12 falls below a preset minimum limit and cause the machine 5 to shut down in that event.

In the practice of the method the individual plastic material ingredients from the respective individual material hoppers 12 are discharged to the common hopper 30 by the discharge devices 16 via the cascade chamber 32 at a controlled material discharge rate. The common hopper 30 is initially filled to a maximum (upper) limit L1 and minimum (lower) limit L2 (illustrated schematically on the common hopper 30 in FIG. 2 for illustrative purposes) preset into the memory of the master computer control device 50. The maximum limit comprises the weight at which the material discharge rate of each metering unit 10 will be reduced by the master computer control unit 50 to a preset minimum material discharge rate to bring the weight of the blended material ingredients M in the common hopper 30 quickly to an intermediate level between the maximum and minimum levels. The minimum limit comprises the weight at which the material discharge rate of the metering units 10 will be increased by the master computer unit 50 to a preset maximum material discharge rate and quickly bring the weight of the blended material ingredients in the hopper 30 to the aforementioned intermediate level.

So-called steady window limits W1, W2 (illustrated schematically on the common hopper 30 in FIG. 2 for illustrative purposes) are preset in the memory of the master computer control unit 50. These steady window limits define a narrow range or window of upper and lower blend weights. A median hopper weight WM is also preset in the memory of the master computer control unit 50 and corresponds to the center point of the steady window range. The master computer control unit 50 will attempt at all times during material processing (extrusion) to maintain the material weight in the hopper 30 stabilized at a near equilibrium weight relative to this center point hopper weight WM by controlling the material discharge rates of the metering units 10 in response to the extrusion rate of the machine 5. In effect, this will maintain a substantially constant head or weight of the blended material ingredients M over the extruder throat 5a during the extrusion operation.

The extrusion machine 5 is operated to extrude the blend M supplied by the common hopper 30 to the extruder throat 5a. The blend M flows out of the opening 30c of the common hopper 30 at a rate determined by the extrusion rate (or other material processing rate) of the extrusion machine 5. As the blend M is extruded, the weight loss of the blend M in the common hopper 30 is determined by the master computer control unit 50 based on the weight loss signals received from the weighing device 40 over time.

The master computer control unit 50 continually monitors the signals from the weighing device 40 and also continually communicates with the computer control devices 20 to receive material discharge rate data therefrom via interfaces 50b.

The master computer control device 50 determines the extrusion rate of the extrusion machine 5 based on the sum of the material discharge rates of the material metering units 10 to the common hopper 30 plus or minus the discharge rate of the blend M from the common hopper 30 to the extrusion machine 5.

The master computer control unit 50 controls (via communication with the computer control devices 20) the material discharge rate of each metering unit 10 in response to the determined (learned) extrusion rate as needed to maintain a preset recipe of the material ingredients at the determined material extrusion rate of the machine 5. In effect, the master computer control unit 50 recalculates, as needed, varying material discharge rates of the metering units 10 and commands each computer control device 20 to increase or decrease the auger speed of the associated discharge device 16 as needed to maintain the preset recipe of ingredients in the blend M at the learned extrusion rate.

The master computer control unit 50 also controls (via the computer control devices 20) the material discharge rates of the metering units 10 to maintain a substantially constant weight or head of blended ingredients M in the common hopper 30 at the learned material extrusion rate of the machine 5. In particular, the head or weight of the blend M in the common hopper 30 is maintained so as to stabilize at the aforementioned center point hopper weight WM at the material extrusion rate of the machine 5. The master computer control unit 50 continually determines minute differential weight changes in the common hopper 30 and calculates the precise differences in the sum of the material discharge rates of the metering units 10 and the extrusion rate. For example, as the weight of the blend M in the common hopper 30 changes during extrusion as a result of changes in extruder operating conditions and the bulk density of the material ingredients, the master computer control unit 50 will alter, i.e., increase or decrease, the material discharge rate of the metering units 10 as needed to maintain the substantially constant weight or head of the controlled blend M in the hopper 30 at the learned extrusion rate of the machine 5.

The apparatus and method of the invention provide accurate ingredient ratio control, accurate extrusion rate calculation, and significantly improved extrusion gauge control resulting from more consistent extruder feed zone pressure.

The disclosed embodiment is representative of the preferred form of the invention, but is intended to be illustrative rather than definitive thereof. The invention is defined in the claims.

I claim:

1. A method of metering different material ingredients for discharge to a material processing machine, comprising:
   delivering to a common hopper a plurality of individual material ingredients at controllable individual material discharge rates,
   discharging material from said common hopper to said processing machine at a discharge rate,
   determining loss of weight of material in said hopper due to discharge of material therefrom,
   determining the material processing rate of the processing machine from the sum of the material discharge rates of the ingredients to the common hopper and the discharge rate of the material from the common hopper to the processing machine, and
   controlling the material discharge rates of the ingredients to the common hopper in response to said determined material processing rate as needed to maintain a preset recipe of said blended ingredients at said determined material processing rate.

2. The method of claim 1 including adjusting the material discharge rates of the ingredients to maintain a substantially constant weight thereof in the common hopper at said material processing rate.

3. The method of claim 2 including adjusting the material discharge rates of the ingredients to stabilize the weight thereof in the common hopper at the center of a preset narrow change of weight range at said material processing rate.

4. A method of metering and blending different plastic material ingredients for discharge to an extrusion machine, comprising:
   metering to a common hopper a plurality of individual plastic material ingredients at controllable individual material discharge rates,
   blending the ingredients discharged from the individual material hoppers to form a blend in the common hopper,
   discharging the blended materials from said common hopper to said extrusion machine at a discharge rate,
   determining loss of weight of the blended materials in said common hopper due to discharge of the blended materials to the extrusion machine,
   determining the extrusion rate of the extrusion machine from the sum of the material discharge rates of the ingredients to the common hopper and the discharge rate of the blended materials from the common hopper to the extrusion machine, and
   controlling the material discharge rates of the ingredients to the common hopper in response to said determined extrusion rate as needed to maintain a preset recipe of the blended ingredients at said determined extrusion rate.

5. The method of claim 4 including adjusting the material discharge rates of the ingredients to maintain a substantially constant weight of the blended materials in the common hopper at said extrusion rate.

6. The method of claim 5 including adjusting the material discharge rates of the ingredients to stabilize the weight of the blend in the common hopper at a center point of a preset narrow weight change range at said extrusion rate.

7. Apparatus for metering different material ingredients for discharge to a material processing machine, comprising:

a plurality of metering devices for providing a controlled discharge rate of individual material ingredients, each of said metering devices comprising an individual material hopper for containing the material ingredient to be metered, first weighing means operably associated with each individual material hopper for detecting loss in weight of the material ingredient therein, a driven discharge device operably associated with each material hopper for discharging the material ingredient therefrom, and computer control means coupled to the weighing device for determining a material discharge rate and operably associated with the driven discharge device of each hopper for controlling the material discharge rate thereof, a common hopper for receiving the ingredients discharged by the metering devices, second weighing means operably associated with the common hopper for detecting a change in weight of the ingredients therein during discharge from the common hopper to the material processing machine, and a master computer control unit coupled to said individual computer control devices and to said second weighing means, said master computer control device being operative to determine the material processing rate of said machine based on the sum of said material discharge rates from the metering devices to the common hopper plus or minus the discharge rate of the ingredients from the common hopper to the processing machine and to control the material discharge rates of the metering devices as needed to maintain a preset recipe of said ingredients at said determined material processing rate.

8. The apparatus of claim 7 wherein the first weighing means comprises a load cell supporting a respective material hopper.

9. The apparatus of claim 7 wherein the discharge device of each metering device comprises a variable speed motor-driven auger.

10. The apparatus of claim 9 wherein the speed of each motor-driven auger is controlled by said master computer control unit via the associated computer control device so as to control the material discharge rate of the metering device.

11. The apparatus of claim 7 including means for receiving and mixing the ingredients discharged by the metering devices to form a blend received by the common hopper.

12. The apparatus of claim 7 wherein the second weighing means comprises a load cell supporting the common hopper.

13. The apparatus of claim 7 wherein the master computer control device is operative to control the material discharge rates of the metering devices so as to maintain a substantially constant weight of the ingredients in the common hopper at said material processing rate.

14. Apparatus for metering and blending different plastic material ingredients for discharge to an extrusion machine, comprising:

a plurality of metering devices for providing a controlled discharge rate of individual plastic material ingredients, each material metering device comprising an individual material hopper for containing the material ingredient to be metered, first weighing means operably associated with each individual material hopper for detecting a loss in weight of the ingredient therein, a motor-driven discharge device operably associated with each material hopper for discharging the ingredient therefrom, and a computer control device coupled to the first weighing means for determining a material discharge rate and operably associated with the motor-driven discharge device of each hopper for controlling the material discharge rate thereof, a cascade chamber for receiving and mixing the ingredients discharged by the metering devices to form a blend, a common hopper for receiving the blend of ingredients from the cascade chamber, second weighing means operably associated with the common hopper for detecting a change in weight of the blend therein during discharge from the common hopper to the extrusion machine, a master computer control unit coupled to said individual computer control devices and to said second weighing means, said master computer control device being operative to determine the extrusion rate of said machine based on the sum of said material discharge rates from the metering devices to the common hopper plus or minus the discharge rate of the blend from the common hopper to the extrusion machine and to control the material discharge rates of the metering devices to the common hopper as needed to maintain a preset recipe and substantially constant weight of said ingredients in the common hopper at said determined extrusion rate.

* * * * *